United States Patent Office 3,606,504
Patented Sept. 20, 1971

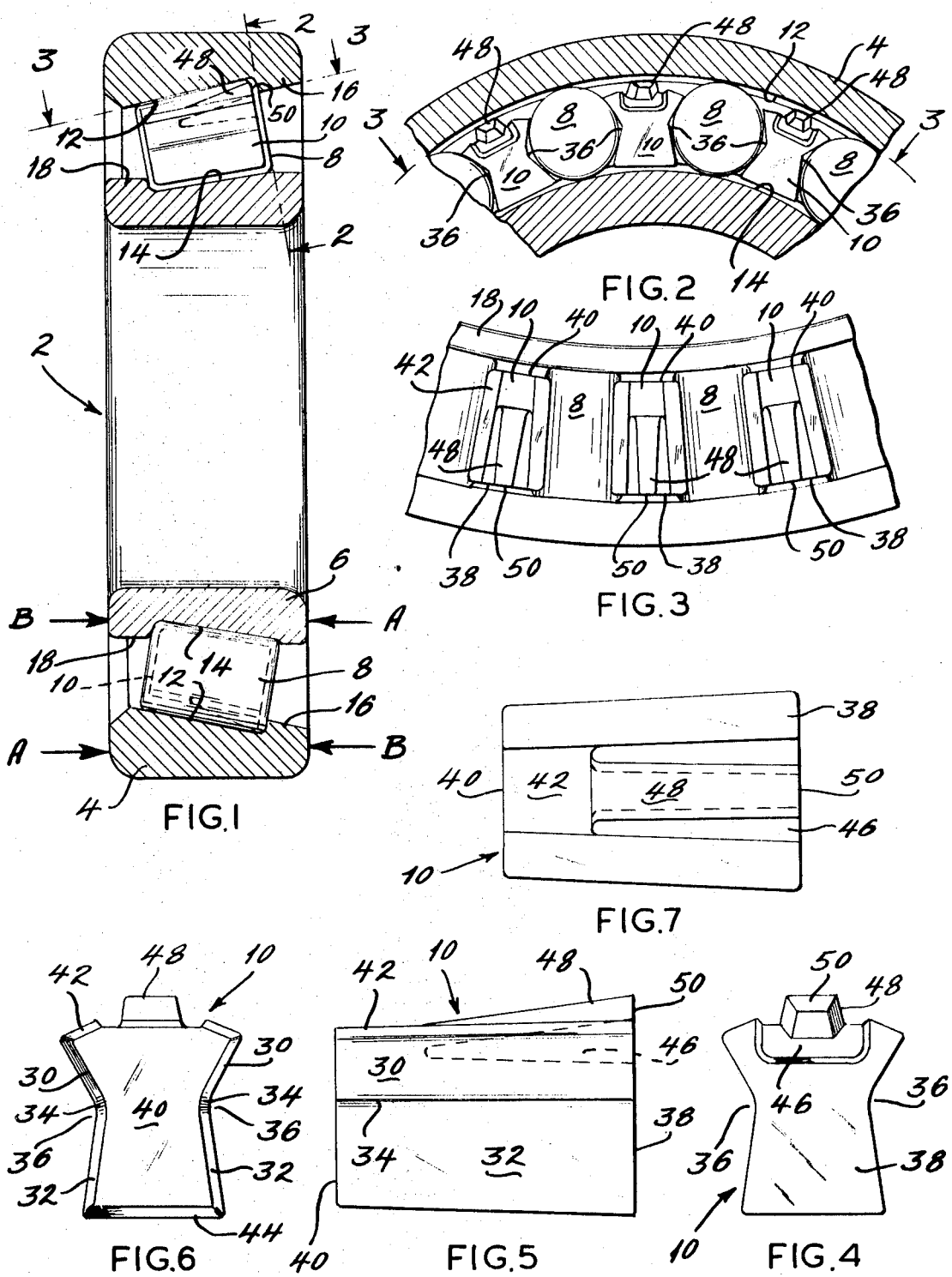

3,606,504
UNITIZED TAPERED ROLLER BEARING AND METHOD OF ASSEMBLING THE SAME
Stanley Wojciechowski, 4508 Edwin Drive NW., Canton, Ohio 44718
Filed Mar. 19, 1970, Ser. No. 21,169
Int. Cl. F16c 19/14
U.S. Cl. 308—214                                    17 Claims

ABSTRACT OF THE DISCLOSURE

A unitized tapered roller bearing has a cup and cone provided with tapered raceways along which tapered rollers run. The cup at the large diameter end of its raceway is provided with an integrally formed thrust rib, and, likewise, so is the cone at the small diameter end of its raceway. Individual separators are positioned between the rollers to maintain the proper circumferential spacing between those rollers, and those separators are retained in the bearing by the thrust ribs. The separators, however, may be distorted sufficiently to enable them to pass between the cup thrust rib and the cone and into the space between the raceways, thus enabling assembly of the bearing.

BACKGROUND OF THE INVENTION

This invention relates in general to bearings and more particularly to improved unitized roller bearings.

Conventional tapered roller bearings accept axial thrust in only one direction, that is, in the direction which compresses the tapered rollers between raceways on the cup and cone, and by reason of this fact, such bearings must either be employed in tandem or else in conjunction with some auxiliary thrust absorbing device.

To overcome the foregoing problem so-called unitized tapered roller bearings were developed, and these bearings differ from conventional tapered roller bearings in that they have one thrust rib at the large diameter end of the raceway on the cup and another rib at the small diameter end of the raceway on the cone. The tapered rollers are positioned between and axially confined by the ribs. Thus, in one direction thrust is taken substantially radially through the rollers, that is, by the rollers being compressed between the raceways, while in the opposite direction the thrust is taken substantially axially, that is, by the rollers being compressed in an axial direction between the thrust ribs.

Unitized bearings of current manufacture contain the conventional pressed steel cage for keeping the rollers apart and correctly spaced around the bearing, and by reason of this fact, the rib on either the cup or cone must be removable to enable the cage and rollers contained in it to be inserted axially into the space between the raceways. This necessitates some sort of retaining device for confining the removable thrust rib and preventing it from displacing under thrust loads applied to it. Usually the confining structure is incorporated into the bearing housing, and when housings are so constructed the bearing cups cannot fit loosely or, in other words, float therein. Thus, most unitized tapered roller bearings will not float in use and are therefore not suitable for use in small electric motors, for example, or other applications which require floating bearings.

SUMMARY OF THE INVENTION

One of the principal objects of the present invention is to provide a tapered roller bearing which is capable of accommodating thrust loads in either axial direction in addition to the normal radial loads. Another object is to provide a bearing of the type stated which is self-contained and does not require additional devices for holding it together. A further object is to provide a bearing of the type stated which need not be confined in its mounting and is therefore free to float relative to the mounting. An additional object is to provide a bearing of the type stated which is simple in construction and easy to assemble. Still another object is to provide a bearing of the type stated in which critical areas receive adequate lubrication, making the bearing highly reliable. These and other objects and advantages will become apparent hereinafter.

The present invention is embodied in a tapered roller bearing having one thrust rib on the large diameter end of the cup and another on the small diameter end of the cone. Individual separators are positioned between the tapered rollers to maintain the proper spacing between them and normally these separators are retained in the bearing by the thrust ribs. The separators, however, may be elastically deflected by an amount sufficient enough to enable them to pass beyond one of the thrust ribs and into the bearing. The invention, in addition, is embodied in a method of assembling the foregoing bearing. The invention also consists in the parts and in the arrangements and combinations of parts hereinafter described and claimed.

DETAILED DESCRIPTION OF DRAWINGS

In the accompanying drawings which form part of the specification and wherein like numerals and letters refer to like parts wherever they occur:

FIG. 1 is a full sectional view of a unitized bearing showing a separator at one side thereof and a roller at the other side;

FIG. 2 is a sectional view taken along line 2—2 of FIG. 1;

FIG. 3 is a fragmentary sectional view taken along line 3—3 of FIG. 1, but is presented arcuately to show the true convergence between the rollers on the tapered raceway of the cone;

FIG. 4 is an end elevational view of the separator forming part of the present invention;

FIG. 5 is a side elevational view of the separator;

FIG. 6 is an elevational view of the opposite end of the separator;

FIG. 7 is a plan view of the separator;

DETAILED DESCRIPTION

Figure 8:
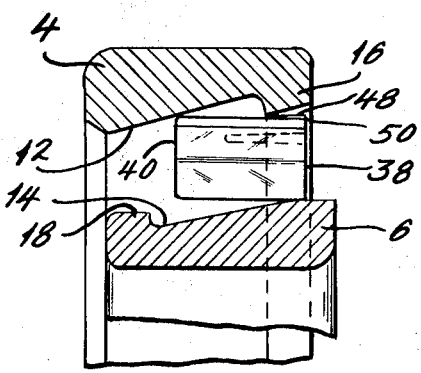
FIG. 8 is a fragmentary sectional view showing a separator being installed in the bearing.

Referring now in detail to the drawings, 2 designates a tapered roller bearing of the single row unitized variety.

Since the bearing is unitized, it possesses the capability of accepting thrust loads in either axial direction as indicated by the two sets of opposing force vectors A and B in FIG. 1. Broadly speaking, the bearing 2 includes a cup 4, a cone 6 positioned concentrically within the cup 4, a plurality of rollers 8 interposed between the cup 4 and cone 6, and a plurality of individual separators 10 also positioned between cup 4 and cone 6 for maintaining correct circumferential spacing between the rollers 8 (FIGS. 2 and 3).

The frusto-conical surfaces of the rollers 8 engage and roll along opposed raceways 12 and 14 on the cup 4 and cone 6, respectively. As the rollers 8 roll along the raceways 12 and 14, the large diameter end faces on the rollers 8 bear against the inside face of a thrust rib 16 which projects radially inwardly toward the cone 6 and is formed integral with the cup 4 at the large diameter end of its raceway 12. Thus, the rib 16 properly positions the rollers 8 between the raceways 12 and 14 and, furthermore, assists in preventing them from skewing relative to the axis of rotation of the bearing 2. Likewise, at the small diameter end of the raceway 14, the cone 6 is provided with an integrally formed thrust rib 18 which projects radially outwardly toward the cup 4.

When thrust loads are applied to the bearing 2 in the direction of the force vectors A the tapered rollers 8 are in effect compressed between or seated against the raceways 12 and 14 and their large diameter ends are positioned against the thrust rib 16. Thus, the thrust load is taken substantially radially by the rollers 8. On the other hand, when thrust loads are applied in the direction of the force vectors B, the end faces of the rollers 8 bear against the thrust ribs 16 and 18 and the thrust is taken substantially axially through the rollers 8. Since thrust loads in the direction of the force vectors A are applied to the rollers 8 along the raceways 12 and 14 where the contact between the rollers and the cup 4 and cone 6 is mainly a rolling engagement, larger thrust loads can be accommodated in this direction. Thrust loading in the direction of the force vectors B, however, involves a sliding contact between the end faces of the rollers 8 and the opposing faces on the ribs 16 and 18 with only a small proportion of the thrust load carried on the raceways 12 and 14 adjacent to the ribs 16 and 18. In view of the foregoing considerations, the bearing 2 should be mounted such that the heaviest thrust loading will coincide with the force vectors A, while lighter or occasional thrust loading is taken in the direction of the force vectors B.

The separators 10 like the rollers 8 are individual elements interposed between the raceways 12 and 14 on the cup 4 and cone 6, respectively. Furthermore, they are positioned between adjacent rollers 8 to maintain the proper circumferential spacing between the rollers 8 as they revolve about their own axes and roll along the raceways 12 and 14. Consequently, the separators 10 take the place of the cage found in conventional tapered roller bearings.

Each separator 10 (FIGS. 4–7) is preferably a unitary construction molded from a low friction plastic material capable of absorbing relatively high impacts and withstanding relatively high temperatures. The plastic material should also possess a limited amount of flexibility or resilience for purposes which will subsequently become more apparent. Separators 10 injection molded from glass-fiber reinforced polymers such as Nylatron G.S.–51 available from the Polymer Corporation of Reading, Pa., have been found to be ideally suited for the present invention.

The sides of each separator 10 are defined by generally planar side faces 30 and 32 (FIG. 6) which are presented at oblique angles to one another and are joined through arcuate connecting surfaces 34. The faces 30 and 32 taper inwardly toward the connecting surfaces 34 so that the minimum section is in the region of the surfaces 34. This imparts a waisted appearance to the separator 10 or, in other words, creates laterally opening depressions 36 which in turn accommodate or receive the sides of adjacent rollers 8 (FIG. 2). The oblique angle between the faces 30 and 32 is such that the frusto-conical surfaces of the adjacent rollers 8 contact those faces outwardly from the connecting surfaces 34 so that a slight void exists between the rollers and the separator 10 at the connecting surfaces 34.

The faces 30 and 32 on one side of the separator 10, furthermore, converge toward the corresponding faces 30 and 32 on the opposite side of the separator 10 so that the depressions 36 are not parallel, but on the contrary, are slightly convergent (FIG. 7). The angle of convergence between the depressions 36 conforms with the convergence between the opposed sides of the frusto-conical surfaces on adjacent tapered rollers 8 (FIG. 3). In other words, the spacing between the sides of adjacent rollers 8 is greater at the thrust rib 16 than at the thrust rib 18, and the depressions 36 converge to accommodate this difference in spacing, enabling the sides of adjacent rollers 8 and the side faces 30 and 32 to remain in contact or close proximity throughout their respective lengths.

Since the separators 10 are waisted and the sides of adjacent rollers 8 fit into the depressions 36, the rollers 8 confine the separators 10 in a radial direction (FIG. 2) or, in other words, restrict movement of the separators 10 in a direction toward or away from the raceways 12 and 14. While the rollers 8 confine radial movement of the separators 10, the separators 10, in turn, confine circumferential movement of the rollers 8 relative to one another.

The separators 10 are slightly shorter than the axial dimension of the rollers 8, and are likewise shorter than the axial distance between the inside faces of the ribs 16 and 18. The separators 10, furthermore, terminate at planar end faces 38 and 40 which are positioned adjacent to the inside faces of the thrust ribs 16 and 18, respectively.

The exterior of each separator 10 is further defined by a segmented outer surface 42 (FIG. 7) and a generally planar inner surface 44, inner and outer in this connection referring to the relative positions of the surfaces with respect to the axis of rotation for the bearing 2. The outer surface 42 is positioned slightly inwardly from the cup raceways 12, whereas the inner surface 44 is positioned slightly outwardly from the cone raceway 14 (FIG. 2). Since radial movement of the separator 10 is confined by the disposition of the sides of adjacent rollers 8 in the depressions 36, the separators 10 are in effect suspended between the rollers 8 and their outer and inner surfaces 42 and 44 never actually contact the raceways 12 and 14. Moreover, the surfaces 42 and 44 converge toward the end face 40 (FIG. 5) to accommodate for the convergence between the raceways 12 and 14.

The maximum distance between the inner surfaces 44 and the outer surfaces 42 at the end face 38 is slightly less than the spacing between the cup thrust rib 16 and the large diameter end of the cone raceway 14. Similarly, the spacing between the surfaces 42 and 44 at the end face 40 is also less than the distance between the cup thrust rib 16 and the large diameter end of the cone raceway 14, but when the separator 10 is fully inserted and suspended between two adjacent rollers 8 its end face 40 is presented opposite to the inside face of the cone thrust rib 18. As will be subsequently described in greater detail, this relationship enables the separator 10 to be inserted into the bearing 2 between the cup thrust rib 16 and the large diameter end of the cone raceway 14, but prevents it from passing out of the opposite side of the bearing 2, that is, from between the small diameter end of the cup raceway 12 and the cone thrust rib 18.

The separator 10 is further provided with a recess 46 (FIGS. 4, 5 and 7) and a retention finger 48 which is disposed partially within the recess 46. More specifically, the recess 46 opens outwardly through end face 38 as well as through the outer surface 42 so as to provide clearance for movement of the finger 48 inwardly against the natural resilience of the material from which the separator 10 is formed. The recess 46 extends a substantial distance into the separator 10, and where it inwardly terminates, the finger 48 merges into the main body of the separator 10 as an integral part thereof. The finger 48 extends outwardly from the inner end of the recess 46 at an angle to the base of the recess 46 and terminates at an end face 50 which is coplanar with the end face 38 or the main body of the separator 10.

Normally, the free end of the finger 48 projects outwardly beyond the thrust rib 16 on the cup 4 (FIG. 1), in which case the end face 50 will be presented toward and will be positioned opposite to the inside face on thrust rib 16, which is the face against which the large diameter end faces of the rollers 8 bear. In other words, when the finger 48 is unrestrained, its end face 50 will abut against the cup thrust rib 16 and prevent withdrawal of the separator 10 past the thrust rib 16. However, when the finger 48 is deflected into the recess 46 against the natural resilience of the material from which the separator 10 is formed, the distance between the outer surface of the finger 48 and the inner surface 44 will be less than the distance between the cup thrust rib 16 and the opposite large diameter end of the cone raceway 14, and this relationship remains true along the entire length of the finger 48. Accordingly, when the finger 48 deflects, the separator 10 may be advanced past the cup thrust rib 16 and into the interior of the bearing 2, that is, between the raceways 12 and 14. When the separator 10 nears full insertion, the end face 40 extends inwardly past the outer margin of the cone thrust rib 18 and the axial or longitudinal advancement of the separator 10 ceases when the end face 40 abuts against the thrust rib 18.

To assemble the bearing 2, the cone 6 is first inserted into the cup 4 and positioned eccentrically with respect thereto so that the raceways 12 and 14 are presented close to one another on one side of the cup 4 and quite far apart on the opposite side. Thereafter, the rollers 8 are inserted into the enlarged space between the raceways 12 and 14 from the end thereof at which the cup thrust rib 16 is located. When the appropriate quantity of rollers 8 is installed in this enlarged space the rollers 8 will be positioned next to one another with little or no spacing between adjacent rollers 8. To place a maximum amount of rollers 8 between the cup 4 and cone 6 in this manner, the cup 4 should be distorted slightly into an elliptical configuration. This deflection should, of course, not exceed the elastic limit of the cup 4, so that the cup 4 will spring back into its circular shape when the loading is released. Next, the rollers 8 are spread out around the cone raceway 14 so that substantially equal spacing exists between them and this, of course, positions cone 6 concentric with respect to the cup 4.

Once the rollers 8 are properly positioned, the separators 10 are advanced axially into the unoccupied spaces between the rollers 8 so that the correct spacing between the rollers 8 is maintained during operation of the bearing 2. More specifically, each separator 10 is oriented such that its side depressions 36 extend generally parallel to the axes of the two adjacent rollers 8 it is intended to separate. Then with its end face 40 leading, the separator 10 is fitted into the space between the cup thrust rib 16 and the opposing surface on the cone 6 (FIG. 8). Since the distance between the outer and inner surfaces 42 and 44 at the end face 40 is less than the radial spacing between the cup thrust rib 16 and the cone 6, that end of the separator 10 will pass beyond the cup thrust rib 16 and enter the annular space between the opposing raceways 12 and 14. As the separator 10 continues to advance it becomes canted relative to the axis of rotation of the bearing 2 and, accordingly, assumes the generally inclined disposition of the adjacent rollers 8.

Once the leading end of the finger 48, that is, the end fixed to the main body of the separator 10, enters the space between the raceways 12 and 14, continued advancement of the separator 10 causes the cup thrust rib 16 to deflect or cam the finger 48 radially inwardly into the recess 46 (FIG. 8), thus diminishing the radial size of the separator 10. Since the spacing between the outer and inner surfaces 42 and 44 is less than the radial distance between the cup thrust rib 16 and the opposing surface of the cone 6 and, further, in view of the fact that the recess 46 is deep enough to enable the finger to depress fully into it, the advancement of the separator 10 is not impeded. When the end face 38 of the separator 10 passes beyond the thrust rib 16, the previously deflected finger 48 will spring outwardly and assume its natural position, in which case its end face 50 will be positioned opposite the inside face on the thrust rib 16 (FIG. 1).

Thus, when the separator 10 is fully inserted into the space between the raceways 12 and 14, it will not work out of the space in either direction inasmuch as the disposition of the finger 48 opposite the inside face of the cup thrust rib 16 prevents movement in one axial direction, whereas the disposition of the end face 40 opposite the inside face of the cone thrust rib 18 prevents displacement in the other axial direction.

Each separator 10 is installed in a like manner and when the bearing 2 contains its full complement of rollers 8 and separators 10, the sides of the rollers 8 will be positioned in the laterally opening depressions 36 of the separators 10. Moreover, the circumferential size of the separators 10 are such that the rollers 8 are afforded little freedom of movement relative to each other in a circumferential direction, and by reason of this fact the proper spacing is maintained between the rollers 8.

In operation, the separators 10 accompanying the rollers 8 around the races 12 and 14. As previously noted, the separators 10 maintain the proper spacing between rollers 8 and this in turn results in a proper load distribution and further holds the bearing together so that it maintains its unitized character.

By reason of the fact that the thrust ribs 16 and 18 are formed as an integral part of the cup 4 and cone 6, respectively, the bearing 2 is completely self-contained and needs no auxiliary constructions to hold it together. Hence, it easily adapts to applications requiring floating mountings.

Figure 10:
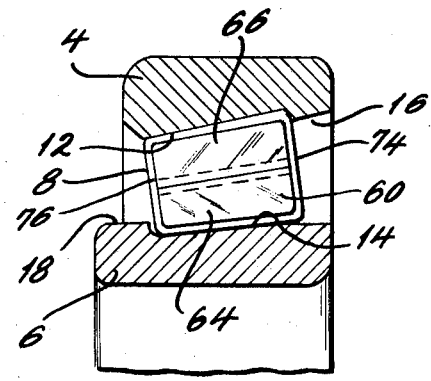
FIG. 10 is a fragmentary sectional view showing the modified separator of FIG. 9 installed in the bearings.
Figure 11:
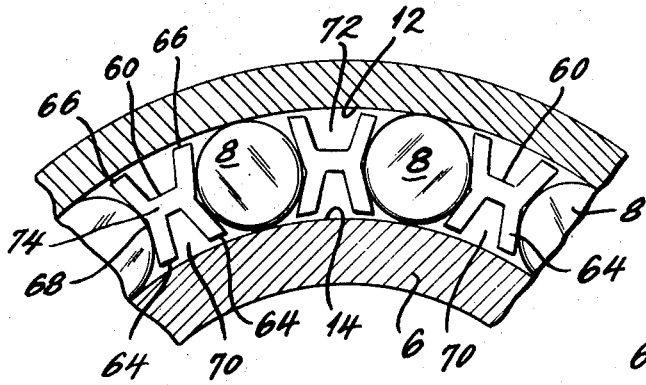
FIG. 11 is a sectional view taken along line 11—11 of FIG. 10.
Figure 9:
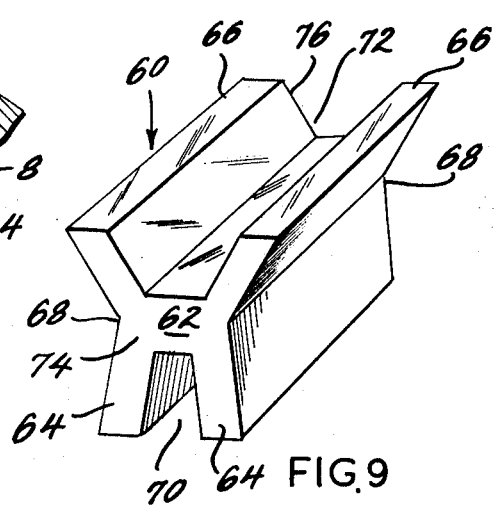
FIG. 9 is a perspective view of a modified separator also forming part of the present invention.

Referring now to FIGS. 9–11, it is possible to replace the separators 10 with modified separators 60 which like the separators 10 are preferably molded from a low friction resilient plastic material. Each separator 60 has a central connecting segment 62 from which pairs of inner and outer diverging legs 64 and 66 emanate. The lateral surfaces of the legs 64 and 66 on each side of the separator 60 are generally planar and taper inwardly to impart a waisted configuration to the separator 60. In particular, the lateral surfaces of the legs 64 and 66 are presented at oblique angles to one another and thus form laterally opening depressions 68 in the sides of the separator 60. These depressions 68, like the depressions 36 in the separators 10, receive the sides of adjacent rollers 8 (FIG. 11) in the bearing 2. Between the inner legs 64 an inner lubrication channel 70 exists and, similarly, between the outer legs 66 an outer lubrication channels 72 exists. The channels 70 and 72 extend axially the full length of the separator 60 and open toward the raceways 14 and 12, respectively.

The ends of the separator 60 are defined by planar end faces 74 and 76 which are spaced apart a distance slightly less than the spacing between the inside faces of the thrust ribs 16 and 18. The radial distance between the inner surfaces of the inner legs 64 and the outer surfaces of the outer legs 66 at the end face 76 is slightly greater than the radial spacing between the cone thrust rib 18 and the opposing surface of the cup 4 (FIG. 10), whereas the corresponding distance at the opposite end, that is, at the end, that is, at the end face 74, is slightly greater than the radial distance between cup thrust rib 16 and the opposing surface of the cone 6. The separators 60 are tapered slightly to correspond to the convergence between the raceways 12 and 14.

The separators 60 are installed between the raceways 12 and 14 generally in the same manner as the separators 10 are installed. As the separators 60 are advanced in between the raceways 12 and 14, the legs 64 and 66 engage the opposing faces of the cup thrust rib 16 and cone 6 and are spread apart circumferentially with continued advancement of the separators 60 into the bearing 2. When the trailing end face 74 of the separator 60 passes beyond the cup thrust rib 16, the legs 64 and 66 of each pair spring toward each other circumferentially and assume their normal position, in which position the legs 66 project outwardly opposite the inside face of the cup thrust rib 16 and cannot be moved past the rib 16 with output again spreading. At the other end of the separator 60, the pair of legs 64 projects inwardly past the cone thrust rib 18 and, consequently, the separator 60 cannot be removed from that side of the bearing either.

The separators 60 function similarly to the separators 10 and enable the bearing 2 to be completely self-contained. The lubrication channels 70 and 72 allow the bearing lubricant to flow along the separators 60 to the inside faces of the thrust ribs 16 and 18.

Figure 12:
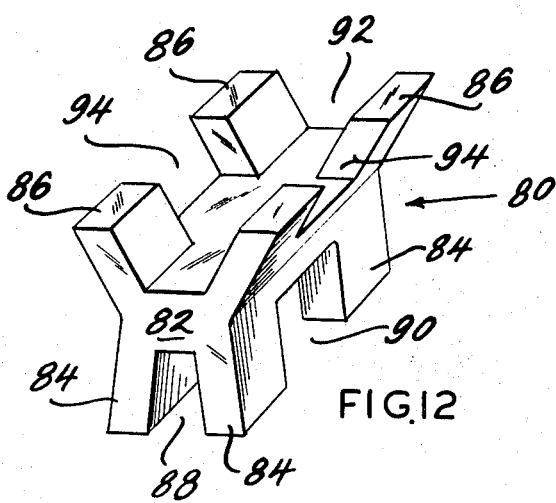
FIG. 12 is a perspective view of still another modified separator.

Referring now to FIG. 12, it is possible to provide another modified separator 80 which has a connecting segment 82 and a pair of inner and outer diverging legs 84 and 86 extending from the connecting segment 82 at each end thereof. The diverging inner legs 84 are separated by a longitudinal lubrication channel 88. Each set of diverging inner legs 84 is separated by a transversely extending lubrication slot 90 which intersects the channel 88. Similarly, the diverging outer legs 86 are separated by a longitudinal lubrication channel 92, and each set of outer legs 86 is separated by a transverse lubrication slot 94.

Aside from the presence of the transverse lubrication slots 90 and 94, the separator 80 is identical to the separator 60. It is, furthermore, installed in the bearing 2 in the same manner as the separator 60.

In use, the lubrication slots 90 enable the bearing lubricant to flow in a circumferential direction also so that the distribution of the lubricnt throughout the bearing 2 is quite thorough.

This invention is intended to cover all changes and modifications of the example of the invention herein chosen for purposes of the disclosure which do not constitute departures from the spirt and scope of the invention.

What is claimed is:

1. A tapered roller bearing comprising a cup having an inwardly presented tapered raceway, a cone positioned within the cup and having an outwardly presented tapered raceway located opposite to the cup raceway, a cup thrust rib projecting inwardly past the large diameter end of the cup raceway, a cone thrust rib projecting outwardly beyond the small diameter end of the cone raceway, a plurality of tapered rollers located between the cup and cone and engaging the raceways, the large diameter ends of the rollers being positioned adjacent the cup thrust rib and the small diameter ends being positioned adjacent the cone thrust rib, and individual separators positioned between the rollers for maintaining the proper circumferential spacing between the rollers, the separators being detached from one another and extending inwardly past the cone thrust rib and outwardly past the cup thrust rib so that the separators are retained in the bearing, the separators being elastically yieldable so that during the assembly of the bearing they may be distorted sufficiently to enable them to pass beyond one of the thrust ribs and into the space between the raceways.

2. A bearing according to claim 1 wherein the cup thrust rib is attached to the cup and the cone thrust rib is attached to the cone.

3. A bearing according to claim 2 wherein the cup thrust rib forms an integral part of the cup and the cone thrust rib forms an integral part of the cone.

4. A bearing according to claim 3 wherein each separator has depressions at its sides; and wherein the sides of the rollers fit into the depressions.

5. A bearing according to claim 3 wherein the separators are molded from a resilient low friction polymer.

6. A bearing according to claim 4 wherein each separator has an outer surface presented toward the cup raceway and an inner surface presented toward the cone raceway; and wherein the inner and outer surfaces converge toward the end of the bearing having the cone thrust rib.

7. A bearing according to claim 4 wherein the sides of adjacent tapered rollers converge toward the end of the bearing having the cone thrust rib; and wherein the side faces which form the depressions in each separator converge toward the same end of the bearing.

8. A bearing according to claim 7 wherein the separators are suspended between and prevented from engaging the raceways by the disposition of the curved roller surfaces in the depressions.

9. A bearing according to claim 3 wherein each separator has a resilient finger which normally increases the size of the separator measured radially to a dimension greater than the spacing between the cup thrust rib and the cone, but when depressed decreases the radial size of the separator to a dimension less than the spacing between the cup thrust rib and the cone, whereby the separator may be inserted between the cup thrust rib and cone and advanced axially into the space between the raceways.

10. A bearing according to claim 9 wherein the end of the finger is normally presented adjacent to the inside face of the cup thrust rib; and wherein the finger is engaged and cammed inwardly toward the axis of rotation for the bearing as the separator is inserted through the space between the cup thrust rib and the cone.

11. A bearing according to claim 10 wherein each separator has a recess into which its finger depresses when the separator is inserted between the cup thrust rib and the cone.

12. A bearing according to claim 3 wherein each separator comprises a pair of diverging legs having free ends positioned adjacent to one of the raceways; and wherein the legs spread apart and diminish the radial size of the separator as the separator is fitted between the cup thrust rib and the cone.

13. A bearing according to claim 3 wherein the separator comprises an inner pair of diverging legs which extend toward and have free ends positioned adjacent the inner raceways, an outer pair of diverging legs which extend toward and are positioned adjacent to the outer raceways, and a connecting segment to which the opposite ends of all the legs are attached; and wherein the legs of each pair spread when the separator is inserted between the cup thrust rib and the cone so that the radial size of the separator diminishes as the separator is inserted into the space between the raceways.

14. A bearing according to claim 13 wherein the legs have transverse slots in them to enable the bearing lubricant to flow circumferentially through the separators.

15. A method of assembling the bearing of claim 3 comprising positioning the cone eccentrically within the cup so that an enlarged space exists between the opposed raceways on one side of the bearing, inserting the rollers into the space between the raceways whereby when the full complement of rollers is installed adjacent rollers will be disposed in close proximity to one another and the rollers will be located in the enlarged space between the raceways, spreading the rollers out around the raceways so that the cone and cup are concentric, and inserting the separators past one of the thrust ribs and into the spaces between the rollers, whereby the shape of each separator will be distorted and its radial dimension diminished as it is advanced past the thrust rib.

16. A method according to claim 15 wherein the separators are inserted past the cup thrust rib.

17. A method according to claim 15 wherein before the separators are inserted the rollers are spread around the raceway until the circumferential spacing between adjacent rollers is substantially the same.

References Cited

UNITED STATES PATENTS 1,787,712    1/1931    Wooler _____ 208—218

MARTIN P. SCHWADRON, Primary Examiner

F. SUSKO, Assistant Examiner

PO-1050
(5/69)

UNITED STATES PATENT OFFICE
CERTIFICATE OF CORRECTION

Patent No. 3,606,504      Dated September 20, 1971

Inventor(s) Stanley Wojciechowski

It is certified that error appears in the above-identified patent and that said Letters Patent are hereby corrected as shown below:

Column 1, line 5, after "44718", add the following:
"Assignor to The Timken Company, Canton, Ohio"

Col. 6, line 37, "accompanying" should read "accompany".

Claim 1, line 5, (Col. 7, line 59) after "projecting"
insert -- "radially"

Claim 1, line 7 (Col. 7, line 61) at the end of the line, after "projecting", insert -- "radially".

Claim 1, line 16 (Col. 7, line 71) after "extending"
insert -- "radially"; and in the same line,
before "out" at the end of the line, insert --
"radially".

Signed and sealed this 21st day of March 1972.

(SEAL)
Attest:

EDWARD M. FLETCHER, JR.          ROBERT GOTTSCHALK
Attesting Officer                Commissioner of Patents